(12) United States Patent
Withall et al.

(10) Patent No.: US 6,520,360 B1
(45) Date of Patent: Feb. 18, 2003

(54) HOUSING FOR DRAFT GEAR

(75) Inventors: Andrew W. Withall, St. Charles, IL (US); David G. Anderson, Chesterton, IN (US); Guenter Manigel, Sycamore, IL (US); Robert S. Toms, Jr., Naperville, IL (US)

(73) Assignee: Miner Enterprises, Inc, Geneva, IL (US)

( * ) Notice: Subject to any disclaimer, the term of this patent is extended or adjusted under 35 U.S.C. 154(b) by 0 days.

(21) Appl. No.: 10/045,493

(22) Filed: Oct. 19, 2001

(51) Int. Cl.[7] ............................................. B65D 55/02
(52) U.S. Cl. .......................................... 213/220; 213/7
(58) Field of Search ........................ 213/7, 40 R, 220, 213/221

(56) References Cited

U.S. PATENT DOCUMENTS

| | | | | |
|---|---|---|---|---|
| 3,084,809 A | * | 4/1963 | Lucchese | 213/220 |
| 3,159,284 A | * | 12/1964 | Holm | 213/22 |
| 4,143,898 A | * | 3/1979 | Klaus et al. | 213/221 |
| 4,198,037 A | * | 4/1980 | Anderson | 213/7 |
| 4,409,881 A | | 10/1983 | van der Wielen | |
| 4,685,384 A | | 8/1987 | Dirkin et al. | |
| 5,116,092 A | | 5/1992 | Schonieber | |
| 5,415,079 A | | 5/1995 | Ching | |
| 5,622,098 A | | 4/1997 | Piper | |
| 6,047,839 A | * | 4/2000 | Huggins | 213/220 |

OTHER PUBLICATIONS

Brochure—"Machining Techniques" by Amalga Composites, Inc. Copyrighted 1998.

* cited by examiner

Primary Examiner—S. Joseph Morano
Assistant Examiner—Robert J. McCarry, Jr.
(74) Attorney, Agent, or Firm—John W. Harbst

(57) ABSTRACT

A housing for a railroad car draft gear is disclosed. The draft gear housing has an axially elongated tubular portion comprised of layers. At least one of the layers of the draft gear housing is formed from a filament wound structure or composite material, and an additional layer may be steel.

20 Claims, 4 Drawing Sheets

HOUSING FOR DRAFT GEAR

BACKGROUND OF THE INVENTION

1. Field of the Invention

This invention relates to a draft gear, and more particularly, to the housing for the draft gear which carries an energy absorption spring package. The draft gear housing is comprised of a layer or layers of a filament wound composite material and, in a preferred embodiment, steel.

2. Prior Art

Draft Gears from there invention in the late 1800s, have included some kind of frame or housing. These frames or housings have, for the most part, been constructed of steel or malleable iron via a semi-sophisticated manufacturing process. Because of various problems, the number of qualified suppliers of castings in the U.S.A has been dwindling and customers have been forced to seek sources of supply overseas and/or pay higher prices in the domestic market. Irrespective of where the steel or malleable iron castings are sourced, because of their material composition, they tend to be heavy and difficult to manufacture. That is, even when manufactured correctly, they add weight to the finished rail car and the shipping costs of the castings themselves tend to be high.

SUMMARY OF THE INVENTION

The present invention overcomes the disabilities of the prior art by providing a draft gear housing which includes a relatively small amount of cast steel or wrought steel or malleable iron, is lightweight and does not require sophisticated manufacturing techniques. In accordance with the present invention there is included a housing having a closed end, and an open end which is axially spaced from the closed end of the housing. Along the length thereof, the draft gear housing includes a series of tubular layers, at least one of which is a filament wound composite material, and another, in certain embodiments, which is steel. The steel layer can be cylindrical in shape or slightly barrel-shaped and can extend either substantially the entire length of the housing or just a portion of the axial length thereof.

Thus, an object of this invention is to provide a draft gear having a housing which includes a filament wound composite material and a minimal amount of steel.

Still a further object of this invention is to provide a draft gear housing which is constructed of a filament wound composite material arranged around a barrel shaped steel cylinder.

An additional object of this invention is to provide a draft gear housing whose bore needs not be only round or rectangular in shape but can be tailored to the particular application.

Another object of this invention is to provide a lightweight draft gear housing which is constructed of fiberglass filament and epoxy resin wrapped around a plastic frame.

Yet another object is to provide a draft gear housing that employs metal, which is cheap, easy to manufacture and which is readily commercially available.

DESCRIPTION OF THE DRAWINGS

Other features and advantages of the invention will become apparent in the following description of the preferred embodiment taken in conjunction with the drawings, in which.

DESCRIPTION OF THE PREFERRED EMBODIMENT

Figure 1:
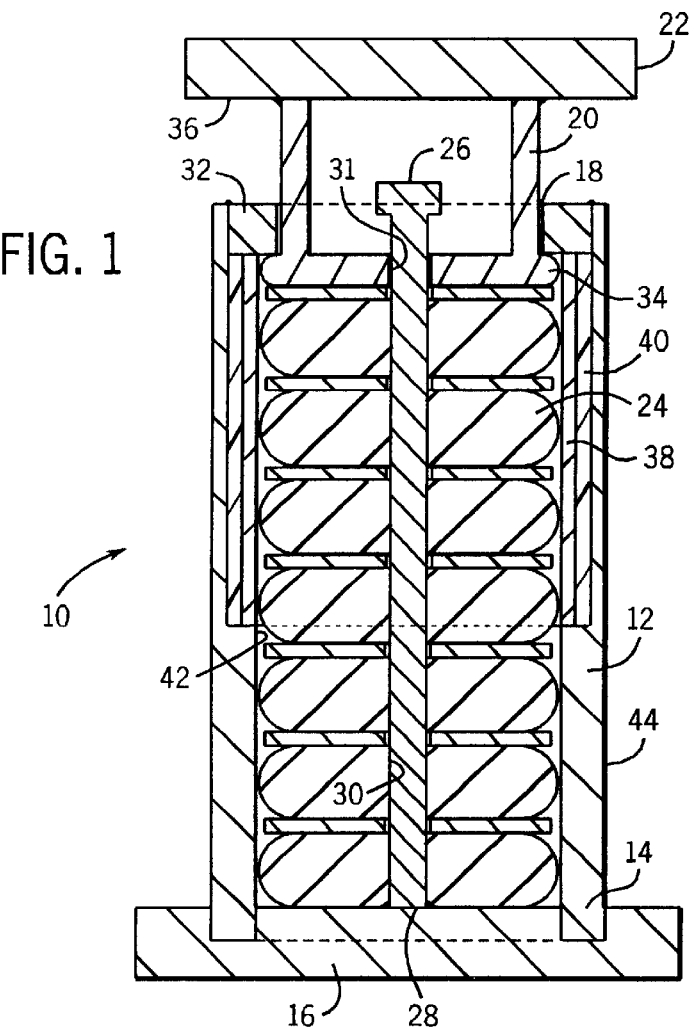
FIG. 1 is a longitudinal cross-sectional illustration of a draft gear housing wherein the steel cylinder extends only part of the length of the bore.
Figure 2:
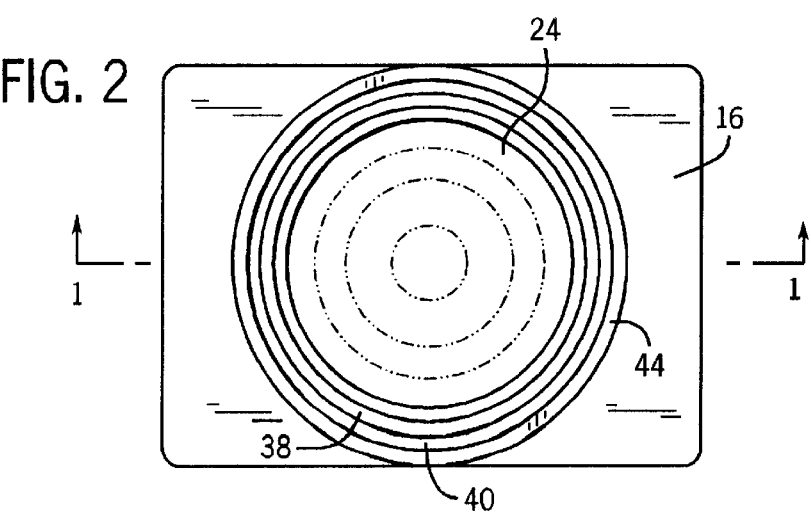
FIG. 2 is a top elevation view of the draft gear housing of FIG. 1.

The invention, as illustrated in the drawings, and particularly in FIG. 1, concerns a draft gear 10 which includes a housing 12 having one end 14 closed by a fixed end wall or plate 16 and an open end 18. The housing 12, carries for reciprocating movement within the open end 18, a plunger 20. The plunger 20 is acted upon by a follower plate 22 in a manner as is well known in draft gear technology. The plunger 20 acts upon a spring assembly arranged within the housing 12 In one form, the spring assembly includes an elastomeric pad stack 24 in a manner well known in the art as disclosed in U.S. Pat. No. 4,566,678. In order to maintain the elastomeric pad stack 24 in a straight column, a guide spike 26 is employed. The guide spike 26 is held stationary at all times by virtue of a head portion 28 of the guide member 26 being fixed to the plate 16. During a work cycle, a pilot hole 30 in the elastomeric pad stack 24, along with a center bole 31 in the plunger 20, allow for the compression of the pad stack while the guide spike remains stationary. The spike can also be captured between the pad and the rear wall.

As often the case, the pad stack 24 may be subjected to a pre-load, in which case a force is exerted against the plunger 20 in a vertical direction. In order to lock or keep the draft gear assembly 10 together, a ring or key 32 is secured to the housing 12 once all the elements have been assembled. The key 32 abuts the ledge 34 of the plunger 20 thereby preventing escape of the elements from the housing 12. The key also functions as part of the solid stop when the draft gear 10 is subjected to a load which goes beyond the load carrying ability of the elastomeric pad stack 24. This condition is called bottoming out and results when excessive energy is transmitted through the bottom 36 of the follower plate 22 to the key 32 and the housing 12. In practice, the excessive energy is transmitted into the housing 12, some of which is dissipated as heat. Whatever is left passes through the plate 16 and then into the body of the rail car.

The housing 12 itself is comprised of at least one layer of a filament wound composite, which in a preferred embodiment is fiberglass filament and epoxy resin. However, it is understood that many other composite materials may be used with the present invention, such as carbon fiber and epoxy resin, or any other composite material. In one embodiment there is a 43 degree wind angle given to the fiberglass which is a compromise between competing radial and longitudinal forces and manufacturability and is known in the art.

Referring now to FIG. 1 and to the housing 12 which in this embodiment employs first 38 and second 40 steel liners that are in a side-by-side relationship. As shown, the two steel liners do not extend the full length of the housing 12, that is, from the open end 18 to the plate 16. In part, this is due to the guide spike 26 which ensures that the elastomeric pad will not contact the inner wall 42 of the housing during a work cycle. The end 14 of the housing 12 is fixed to the end wall 16 by being inserted into a groove or channel 43 and then secured. As is apparent, any suitable means for fixing the end 14 to the end wall 16 is acceptable. The remainder of the housing 12 is a matrix of fiberglass filament and epoxy resin 44. Although not shown, it is contemplated that the housing 12 could be constructed entirely of a matrix of fiberglass filament and expoxy resin. Additionally, contemplated is the substitution of a composite plastic for any steel items.

Figure 3:
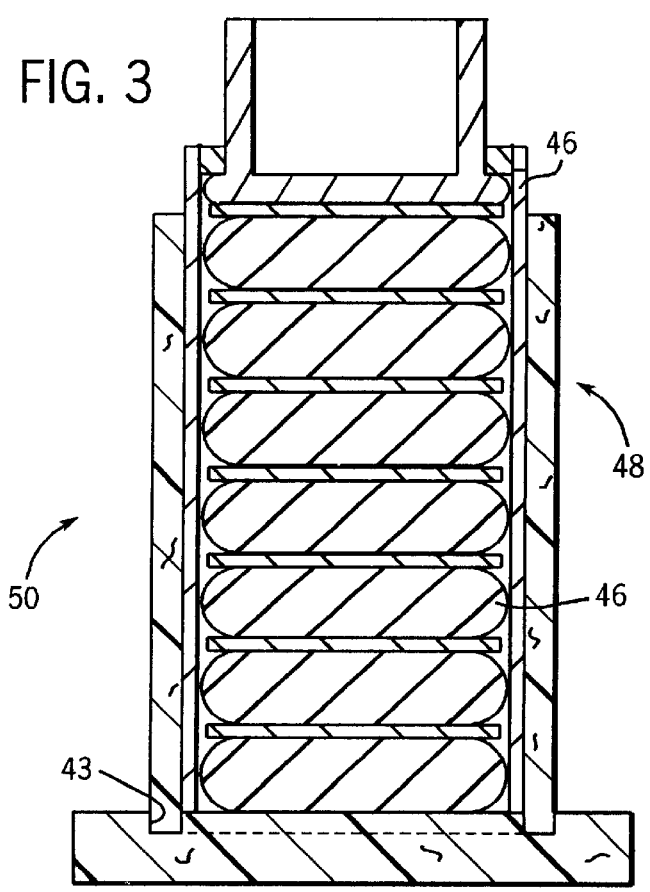
FIG. 3 is a second embodiment of a draft gear housing wherein a steel tubular member extends substantially the full length of the draft gear housing.

Referring now to FIG. 3 wherein another embodiment of the invention is shown. In this embodiment the elastomeric pad stack 46 is not provided with a guide spike such as 26, but rather has a single steel liner 46 which extends the entire length of the housing 48. In the event of a bottoming out of the draft gear 50, the steel liner 46 will bear the majority of the load. Another way to dissipate the energy in a bottoming out situation is to employ a liner which changes some of the longitudinal forces into hoop forces against the fiberglass matrix, such as the barrel-shaped steel liner 52 shown in FIG. 11.

Figure 11:
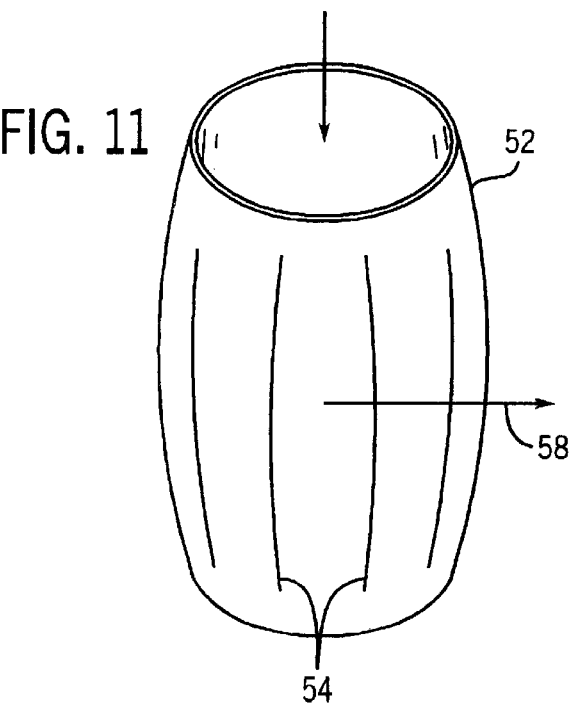
FIG. 11 is a side perspective of a steel cylinder prior to the addition of the fiberglass and epoxy resin matrix which is barrel-shaped.
Figure 4:
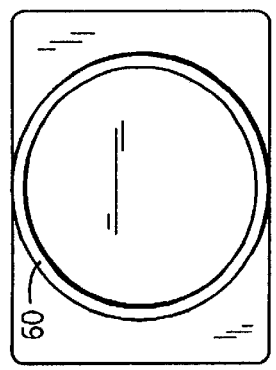
FIGS. 4, 5, 6, 7, 8 and 9 illustrate that the draft gear housing bore can take a number of different shapes.
Figure 5:
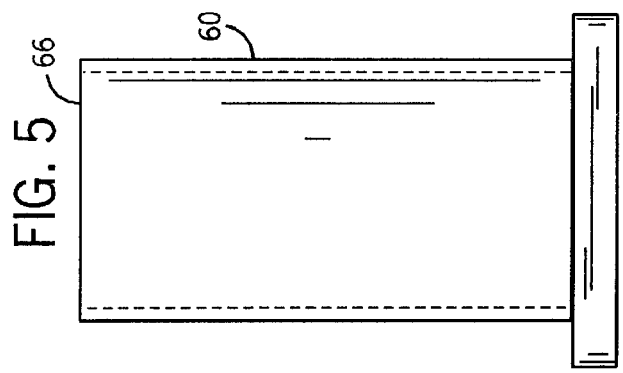
Figure 6:
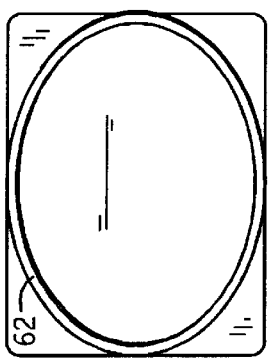
Figure 7:
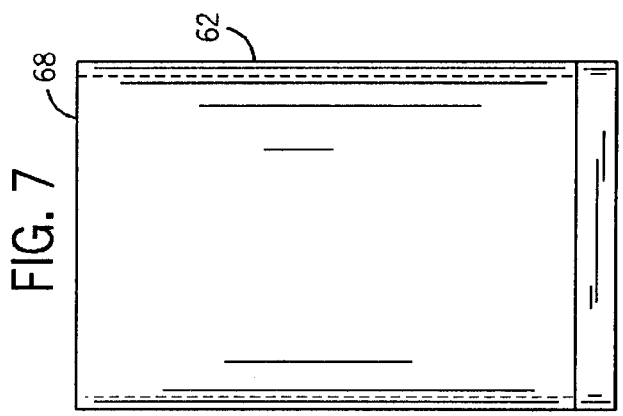
Figure 8:
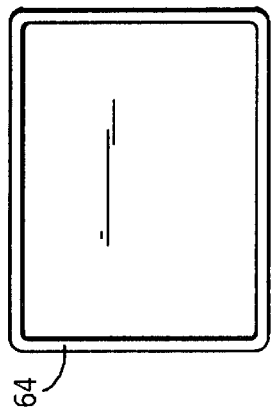
Figure 9:
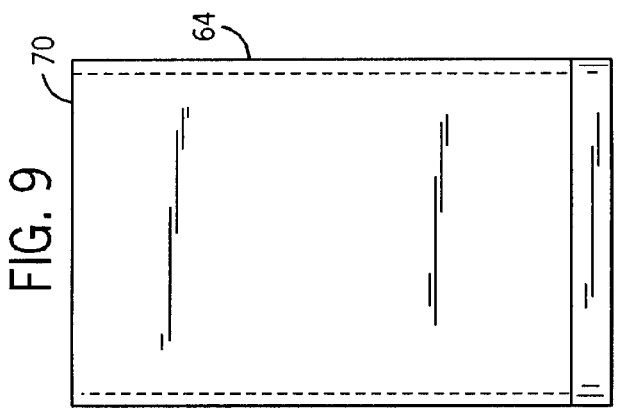

The steel liner 52 shown in FIG. 11 is not only barrel-shaped, it is provided with relief means such as slits 54 extending generally parallel to a longitudinal axis of the liner 52. The liner, with or without relief means, can take many shapes but is designed to translate energy from a horizontal direction extending substantially parallel to a longitudinal axis of the draft gear housing 12, such as in a bottoming out situation, into a direction extending generally normal to the longitudinal axis of the of the draft gear housing 12 and radially against a filament wound composite or structural matrix which is wrapped thereabout. In practice, and as schematically illustrated in FIG. 11, the bottoming out energy is imparted to the liner 52 in the direction of arrow 56 whereby causing the liner 52 to compress against an end wall, such as 16. Because of the shape of the liner and the relief means, in this embodiment slits 54, the axial length of the liner is compressed while simultaneously bulging outwardly in the direction of arrow 58 against the surrounding filament wound composite or structural matrix (not shown in FIG. 11) where such energy is converted into heat and dissipated. The steel liners, shown in FIGS. 3 and 11, are but two embodiments and any liner having relief means and/or barrel shapes or whatever, that while captured converts input energy moving in a direction extending generally parallel to the longitudinal axis of the draft gear housing 12 into output energy moving in a direction extending generally normal to the longitudinal axis of the draft gear housing 12 (90 degrees out of phase relative to the input force energy direction) will be equally satisfactory.

FIGS. 4–9 are but other examples of the different shapes that the draft gear housings 60, 62 and 64 may take because of the versatility and draft housing design freedom allowed or yielded by forming at least a lengthwise portion of the draft gear housing from filament wound composite or structural matrix constructions. This freedom allows the tailoring of the housing of the draft gear to fit the available space constraints in the rail car. It should be noted that in these particular embodiments, the filament wound composite or structural matrix 66, 68, and 70 forming an integral part of the draft gear housing was formed around a mandrill without either a steel or composite plastic liner.

Figure 10:
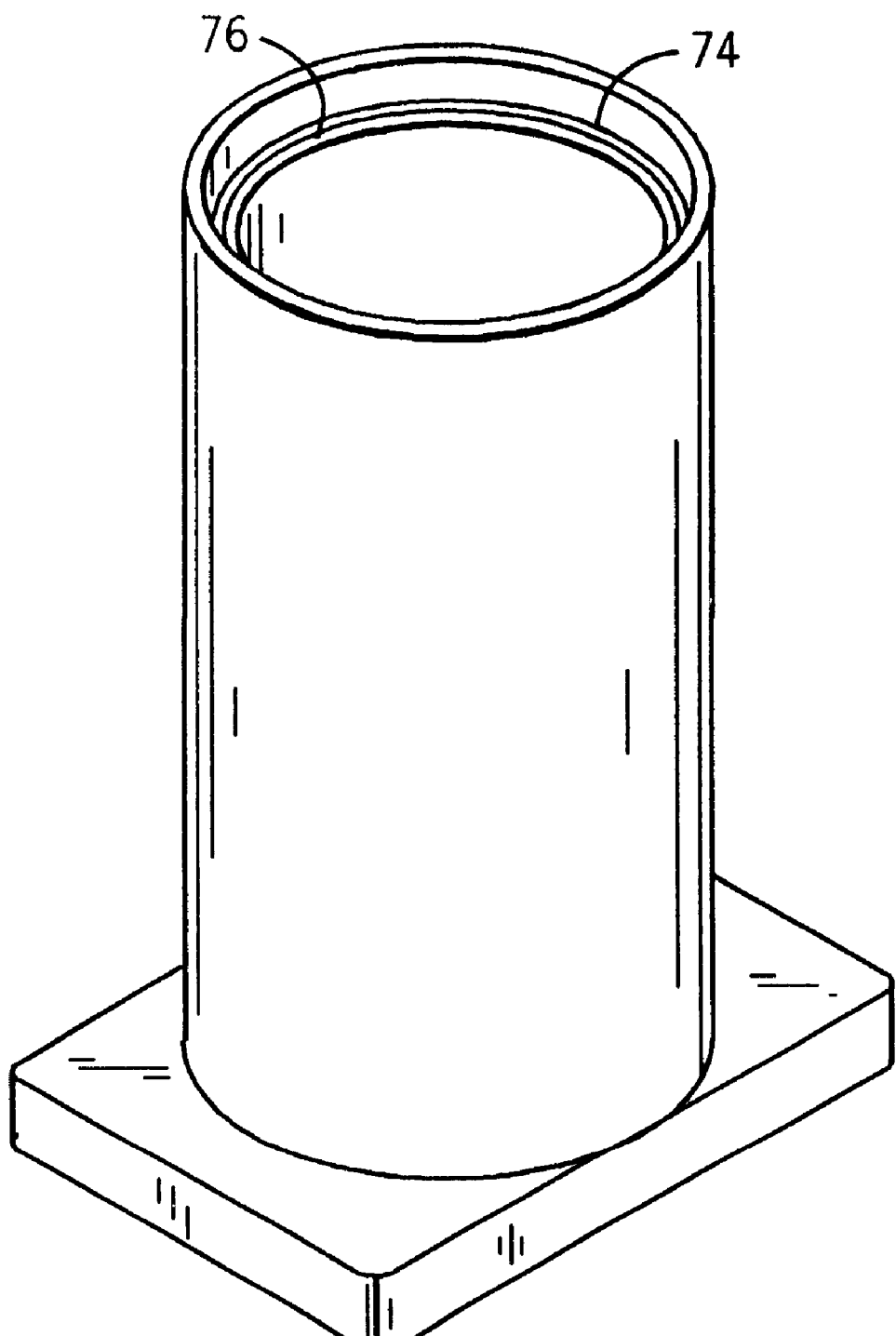
FIG. 10 is a side perspective of a fiberglass filament and epoxy resin matrix wrapped around a composite plastic liner.

FIG. 10 is still another embodiment wherein a filament wound composite or structural matrix 72 has been formed around first and second composite plastic liners 74 and 76. As stated above, composite plastics may be substituted for steel, but in the event standard friction draft gear elements were to be incorporated into a filament wound composite or structural matrix draft gear housing, a steel liner would preferably be used in combination therewith.

While embodiments of this invention have been shown and described, it should be understood that this invention is not limited hereto except by the scope of the claims. Various modifications and changes may be made without departing from the scope and spirit of the invention as the same will be understood by those skilled in the art.

We claim:

1. An elastomeric spring pad draft gear comprising;
    a housing having a closed end, an open ends and a cylindrical portion defining an axial length of said housing between said closed end and said open end, said cylindrical portion including a series of layers, a first of said layers being a filament wound structure layer, a second of said layers being steel, and with said closed end being steel and said cylindrical portion being secured thereto;
    an elastomeric pad stack carried within said cylindrical portion, said elastomeric pad stack including a series of elastomeric pads, with each pad defining a generally centralized hole opening at opposite ends; and
    a guide rod having a base secured to said closed end and a shaft portion passing through said hole in said elastomeric pads and extending toward said open end of said housing.

2. The draft gear according to claim 1 wherein said cylindrical portion adjacent to said closed end is fiberglass filament and epoxy resin.

3. The draft gear according to claim 2 wherein said second metal layer extends from near said open end of said housing to a point near a midsection of said cylinder portion.

4. The draft gear according to claim 3, which includes another metal layer arranged contiguous with said second layer.

5. The draft gear according to claim 1 wherein said second metal layer extends substantially the entire axial length of said housing.

6. The draft gear according to claim 1 wherein said second steel layer extends from said open end to said closed end.

7. A draft gear comprising
    a housing having a closed end, an open end, and a barrel portion defining an axial length of said housing between said closed end and said open end, said barrel portion including first and second layers, with said first layer being a filament wound structure layer, and with said second layer extending from said closed end to said open end;
    an elastomeric spring assembly carried within said barrel portion of said housing; and
    a plunger operably biased by said spring assembly and mounted for axial movement in the open end of said housing and against which an external force can be applied.

8. The draft gear according to claim 7 wherein said second layer is formed from steel and extends from said open end to said closed end of said housing and acts as an over-solid stop.

9. The draft gear according to claim 8 wherein said second steel layer is barrel-shaped.

10. The draft gear according to claim 9 wherein said second steel layer has reliefs whereby external force in a direction parallel to a major axis of the draft gear are directed in a direction generally normal to the major axis of the draft gear and against said filament wound structure layer of said housing.

11. The draft gear according to claim 10 wherein said second steel layer is contiguous with said filament wound structure layer of said housing.

12. The draft gear according to claim 7 wherein said filament wound structure layer of said housing is comprised of a fiberglass filament and epoxy resin composite.

13. The draft gear according to claim 7 wherein said filament wound structure layer of said housing is comprised of a carbon filament and epoxy resin composite.

14. A railroad car draft gear comprising:

a housing having a closed end, an open end, and a tubular portion defining an axial length of said housing between said closed end and said open end, and wherein said tubular portion of said housing is comprised of a series of layers including an outer filament wound structure layer and an inner metallic layer; and a spring assembly arranged within said housing for resisting impacts imparted to said draft gear.

15. The railroad car draft gear according to claim 14 wherein said closed end of said housing is formed from metal and said tubular portion of said housing is operably secured to the closed metal end of said housing an extends axially away therefrom.

16. The railroad car draft gear according to claim 14 wherein the closed end of said housing and said second layer of said housing are both formed from steel.

17. The railroad car draft gear according to claim 14 wherein said outer filament wound structure layer of said housing is comprised of a fiberglass filament and epoxy resin composite.

18. The railroad car draft gear according to claim 14 wherein said outer filament wound structure layer of said housing is comprised of a carbon filament and epoxy resin composite.

19. The railroad car draft gear according to claim 14 wherein said spring assembly includes a series of elastomeric pads arranged in stacked relationship relative to each other.

20. The railroad car draft gear according to claim 19 wherein each of said elastomeric pads in said series defines a generally centralized throughbore, and wherein said draft gear further includes a member axially extending through said throughbores defined by said series of elastomeric pads for guiding said pads along a generally fixed path of travel.

* * * * *